US010964097B2

(12) United States Patent
Teply et al.

(10) Patent No.: US 10,964,097 B2
(45) Date of Patent: Mar. 30, 2021

(54) PATTERN RECOGNITION SYSTEMS AND METHODS FOR PERFORMING SEGMENTATION ON SURFACES AND OBJECTS

(71) Applicant: Cambrian Tech, LLC, Leawood, KS (US)

(72) Inventors: Joel Teply, Leawood, KS (US); Heather Spalding, Leawood, KS (US)

(*) Notice: Subject to any disclaimer, the term of this patent is extended or adjusted under 35 U.S.C. 154(b) by 101 days.

(21) Appl. No.: 16/035,332

(22) Filed: Jul. 13, 2018

(65) Prior Publication Data
US 2019/0043246 A1    Feb. 7, 2019

Related U.S. Application Data

(60) Provisional application No. 62/532,146, filed on Jul. 13, 2017.

(51) Int. Cl.
| *G06T 7/00* | (2017.01) |
| *G06T 15/20* | (2011.01) |
| *G06T 19/20* | (2011.01) |
| *G06T 19/00* | (2011.01) |

(52) U.S. Cl.
CPC .............. *G06T 15/205* (2013.01); *G06T 7/97* (2017.01); *G06T 15/20* (2013.01); *G06T 19/006* (2013.01); *G06T 19/20* (2013.01); *G06T 2210/04* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS

| 8,668,498 | B2 | 3/2014 | Calman et al. |
| 9,240,077 | B1* | 1/2016 | Kraft ................... H04N 5/23229 |
| 9,336,629 | B2* | 5/2016 | Finn ......................... G06K 9/22 |
| 9,761,055 | B2* | 9/2017 | Miller ................ G02B 27/0093 |
| 10,606,824 | B1* | 3/2020 | Fire ...................... H04W 4/021 |

(Continued)

OTHER PUBLICATIONS

Xu, D.; Tian, Y.; A Comprehensive Survey of Clustering Algorithms; Annals of Data Science, 2015, vol. 2, No. 2; retrieved from "https://link.springer.com/article/10.1007/s40745-015-0040-1"; pp. 165-193.

(Continued)

*Primary Examiner* — Vikkram Bali
(74) *Attorney, Agent, or Firm* — Sandberg Phoenix and von Gontard

(57) ABSTRACT

A system and method for capturing an image of a physical space and designing a multidimensional artificial depiction of design option modifications thereto, using a mobile device or computer, using AR. The system includes CR software programs to identify and segment surfaces and objects in the physical and multidimensional artificial spaces; to determine lighting in the spaces, and to map locations into 3D depictions. Also included is a user interface to provide user input and computer feedback, a user control component to change at least two features within the depiction thus generating an overlay of the multidimensional artificial space as to the physical space.

11 Claims, 7 Drawing Sheets

(56) References Cited

U.S. PATENT DOCUMENTS

| | | | |
|---|---|---|---|
| 2010/0185529 A1* | 7/2010 | Chesnut | G06Q 30/00 |
| | | | 705/26.1 |
| 2016/0148433 A1* | 5/2016 | Petrovskaya | G02B 27/01 |
| | | | 345/633 |
| 2017/0178222 A1* | 6/2017 | High | G01N 33/24 |

OTHER PUBLICATIONS

Lopez-Moreno, J., Hadap, S., Reinhard, E.; Gutierrez, D.; Light source detection in photographs; retrieved from "http://www.erikreinhard.com/papers/ceig_2009.pdf"; CEIG '09, San Sebastian, Sep. 9-11, 2009; Andujar, C.; Lluch, J. (Editors); © Eurographics Assn. 2009; Universidad de Zaragoza; Adobe Sysems Inc.; University of Bristol; 7 pages.

Nishino, K., Zhang, Z., Ikeuchi, K.; Determining Reflectance Parameters and Illumination Distribution from a Sparse Set of Images for View-dependent Image Synthesis; retrieved from "http://research.microsoft.com/en-us/um/people/zhang/Papers/ICCV01-Reflectance.PDF"; (ICCV 2001), Vancouver, Canada, Jul. 2001; pp. 1-8.

Cluster Analysis: Basic Concepts and Algorithms; Chapter 8, retrieved from "https://www-users.cs.umn.edu/~kumar001/dmbook/ch8.pdf"; Tan PN, Steinbach M., Kumar V.; Journal: Introduction to data mining 8, 2006, Addison-Wesley Longman Publ. Co., Boston, MA; pp. 487-568.

Eddins, S., MathWorks; The Watershed Transform: Strategies for Image Segmentation; retrieved from "https://www.mathworks.com/company/newsletters/articles/the-watershed-transform-strategies-for-image-segmentation.html?s_tid=srchtitle"; Publ. 2002, 9 pages.

Shaw, J.; Quick Fill: An Efficient Flood Fill Algorithm; Article Mar. 12, 2004; retrieved from "https://www.codeproject.com/Articles/6017/QuickFill-An-efficient-flood-fill-algorithm"; © CodeProject, 1999-2017 www.codeproject.com; 16 pages.

Kanungo, T., Mount, D. M., Netanyahu, N. S., Piatko, C. D., Silverman, R. And Wu, A.Y.; An Efficient k-Means Clustering Algorithm: Analysis and Implementation; retrieved from "http://www.cs.umd.edu/~mount/Papers/pami02.pdf"; IEEE Transactions on Pattern Analysis and Machine Intelligence, vol. 24, No. 7, Jul. 2002; pp. 881-892.

K-means clustering; Wikipedia®, the free encyclopedia; retrieved from "https://en.wikipedia.org/w/index.php?title=K-means_clustering&oldid=780339962" at 12:25, May 14, 2017; 10 pages.

Jain, A.K, Murty, M.N., and Flynn, P.J.; Data Clustering: A Review; ACM Computing Surveys; retrieved from "https://www.cs.rutgers.edu/~mlittman/courses/lightai03/jain99data.pdf"; vol. 31, No. 3, Sep. 1999; pp. 264-323.

Edge detection, Wikipedia®; retrieved from "https://en.wikipedia.org/w/index.php?title=Edge_detection&oldid=777273106"; at 06:21, Apr. 26, 2017; 16 pages.

Quantization (signal processing), Wikipedia®; retrieved from "https://en.wikipedia.org/wiki/Quantization_(signal_processing)", last edited 20:40 (UTC) Nov. 21, 2019; 13 pages.

Thresholding (image processing), Wikipedia®; retrieved from "https://en.wikipedia.org/wiki/Thresholding_(image_processing)", last edited 22:32 (UTC), Dec. 15, 2019.

Fung, G. (2001). A Comprehensive Overview of Basic Clustering Algorithms, retrieved from "https://sites.cs.ucsb.edu/~veronika/MAE/clustering_overview_2001.pdf", 37 pages.

\* cited by examiner

PATTERN RECOGNITION SYSTEMS AND METHODS FOR PERFORMING SEGMENTATION ON SURFACES AND OBJECTS

CROSS-REFERENCE TO RELATED APPLICATIONS

This application claims the benefit of Provisional Patent Application Ser. No. 62/532,146, filed Jul. 13, 2017, which is incorporated herein by reference.

STATEMENT REGARDING FEDERALLY SPONSORED RESEARCH OR DEVELOPMENT

Not applicable.

BACKGROUND OF THE INVENTION

The subject matter described herein relates generally to computer augmented reality (AR) applied to home and landscaping, involving segmentation and related applications. More specifically, it relates to mobile or other computer applications that allow users to depict realistic "before and after" representations of their home design or remodeling projects by virtually modifying multiple surfaces and objects, e.g., in their home or landscape with ones they select, easily and quickly, in real time.

Designing a home, small business office or laying out a landscape is often an emotionally- and/or economically-taxing investment which can be difficult, time consuming and easily prone to mistake. It is difficult for the homeowner, for example, to visualize the eventual transformation of their home or landscape before beginning their remodeling or design project. Typically, the process involves going to the paint, nursery (or other) store, bringing home several swatches of paint, flooring, countertops, tile, plant pictures, etc. to lay around the house or yard. Even then, it is extremely difficult to accurately imagine how these finishes will look when actually applied. Such home, business or landscape remodeling projects are often costly and budget sensitive. Ideally, therefore, customers desire greater certainty as to what the outcome will look like before they spend their money and begin such projects.

This is important, of course, to contractors, interior designers, architects and real estate agents regularly impacted by such endeavors. Even more so these days, there is such an ever-growing legion of "do it yourselfers", that they now merit their own acronym—"DIYers". Whether a DIYer or a professional, all desire to experience a realistic "before and after" transformation effect, but doing so currently requires expensive computer programs that are time consuming, not always reliable and not readily accessible. These programs are also very limited in their capacities, do not translate readily to mobile devices, and are unable to rapidly change, so DIYers and others involved in such efforts cannot easily view multiple changes of design options in real-time or even relatively quickly.

Additionally, once they have selected the design elements they want in their home, office or landscape, customers desire to have a simple and convenient way to purchase their materials, and hire any necessary labor or professionals for their project. Moreover, they want to be in position to receive suggestions on such decision-making. The DIYer and others involved in this endeavor are looking for a solution that provides them with the experience, finances, timing and commitment to make this a seamless and more enjoyable process.

However, the inability of traditional augmented reality systems to "think" with human dexterity and to process with anything approaching real time speed has been an obstacle to providing for rapid, realistic transformational depictions.

Accordingly, there is a need for a system, computer program product and a method which provides for mobile and other computer applications that allow users to virtually modify multiple surfaces and objects, e.g., in their home or landscape with ones they select, easily and quickly, accurately, and in real time.

SUMMARY OF THE INVENTION

Accordingly, applicant has discovered that there is a need to address the above described limitations and has devised a computer-implemented system and method to address these concerns in pattern recognition systems and methods for performing real-time and realistic "before and after" representations involving segmentation on home and landscape surfaces and objects. Other aspects of the system and method of the system are set forth in greater detail herein below.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION OF THE INVENTION

Figure 1:
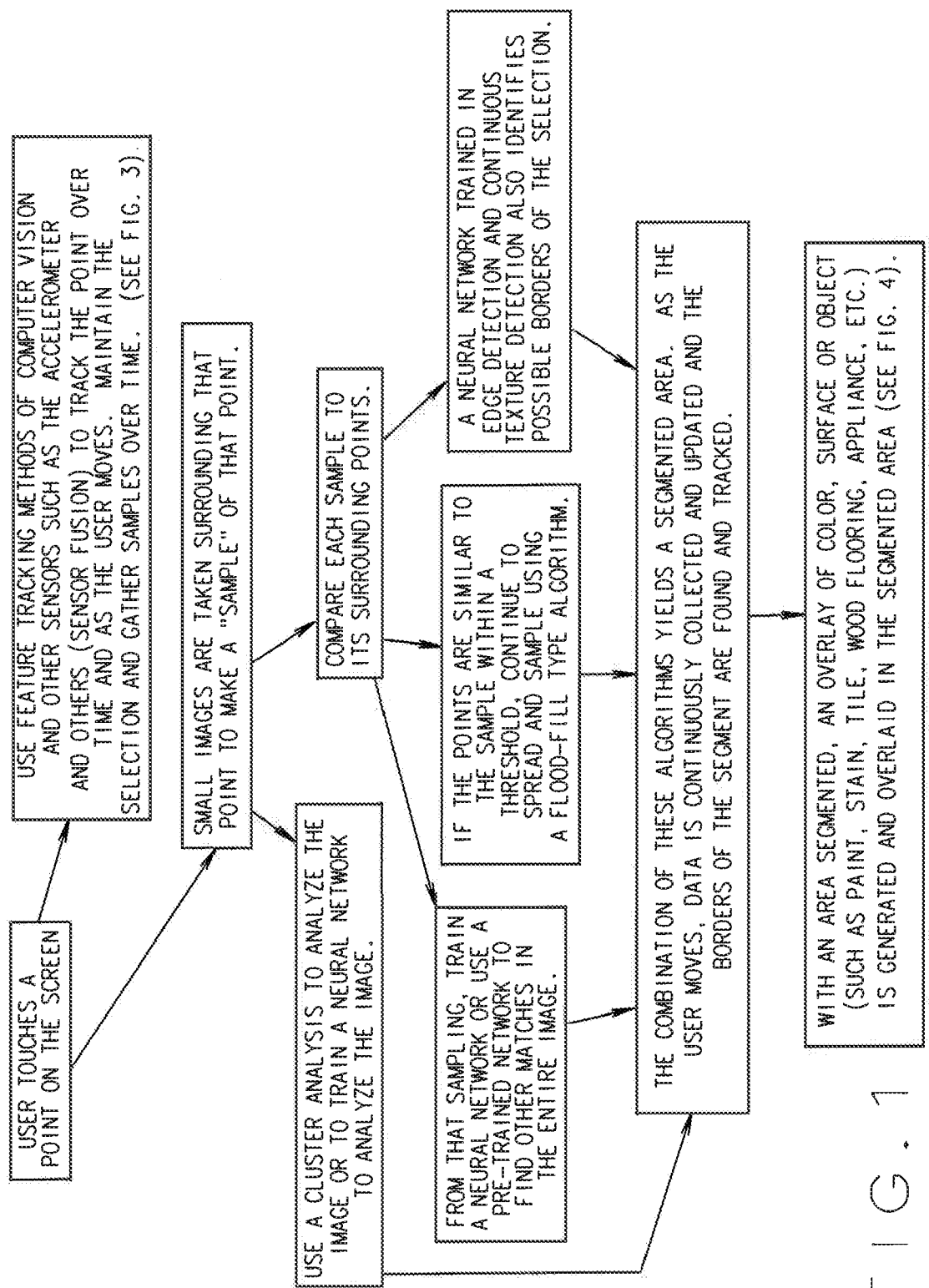
FIG. 1 is a flow chart showing the steps in an embodiment of a segmentation process according to the invention in which a user employs a smart phone or computer to create an overlay of color, surface and/or objects generated and overlaid in a segmented area.
Figure 2:
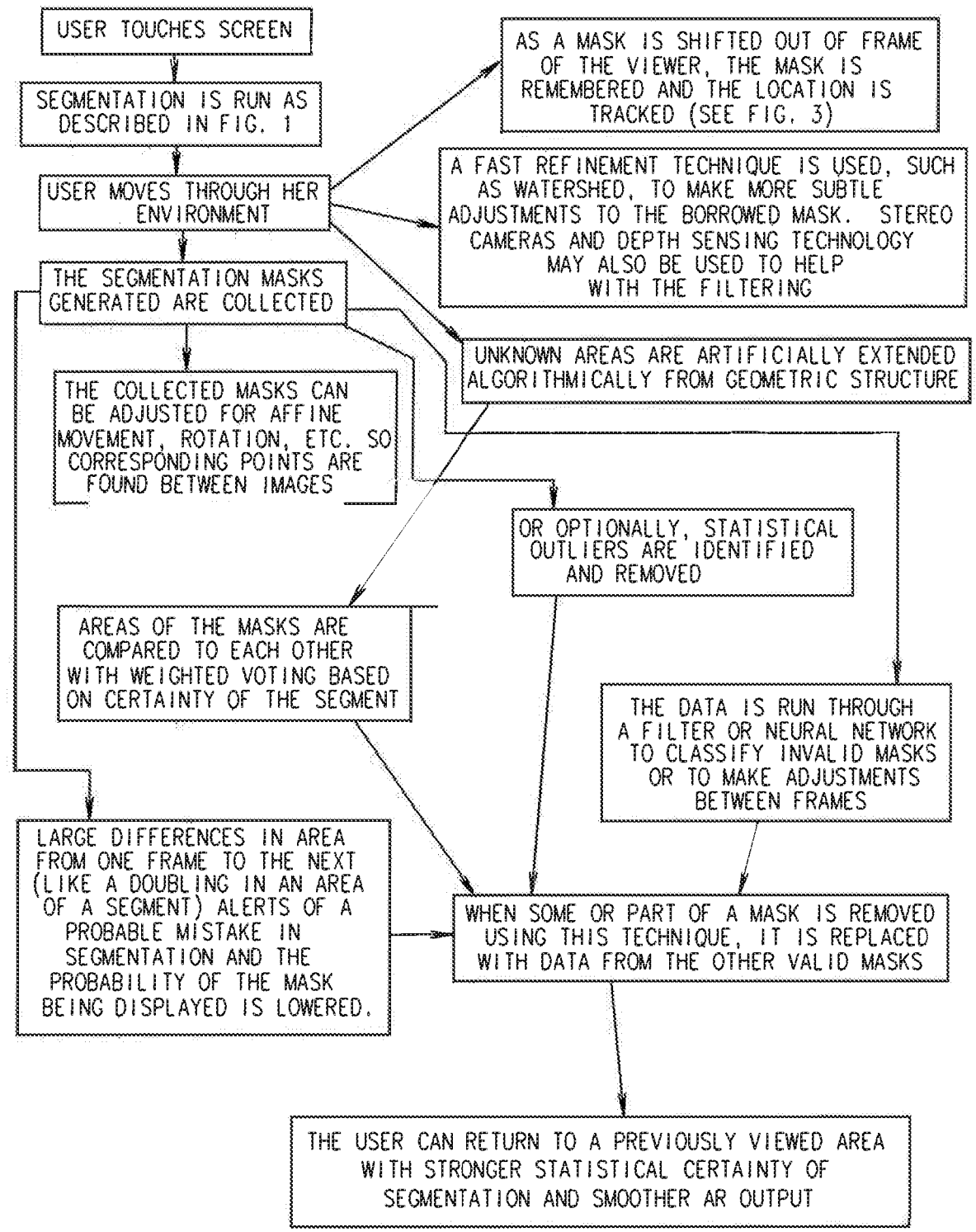
FIG. 2 is a flow chart showing the steps in an embodiment of a non-flickering segmentation process according to the invention in which a user employs a smart phone or computer to create an overlay of color, surface and/or objects generated and overlaid in a segmented area in which a user moves through her environment and segmentation masks are generated, collected and refined.
Figure 3:
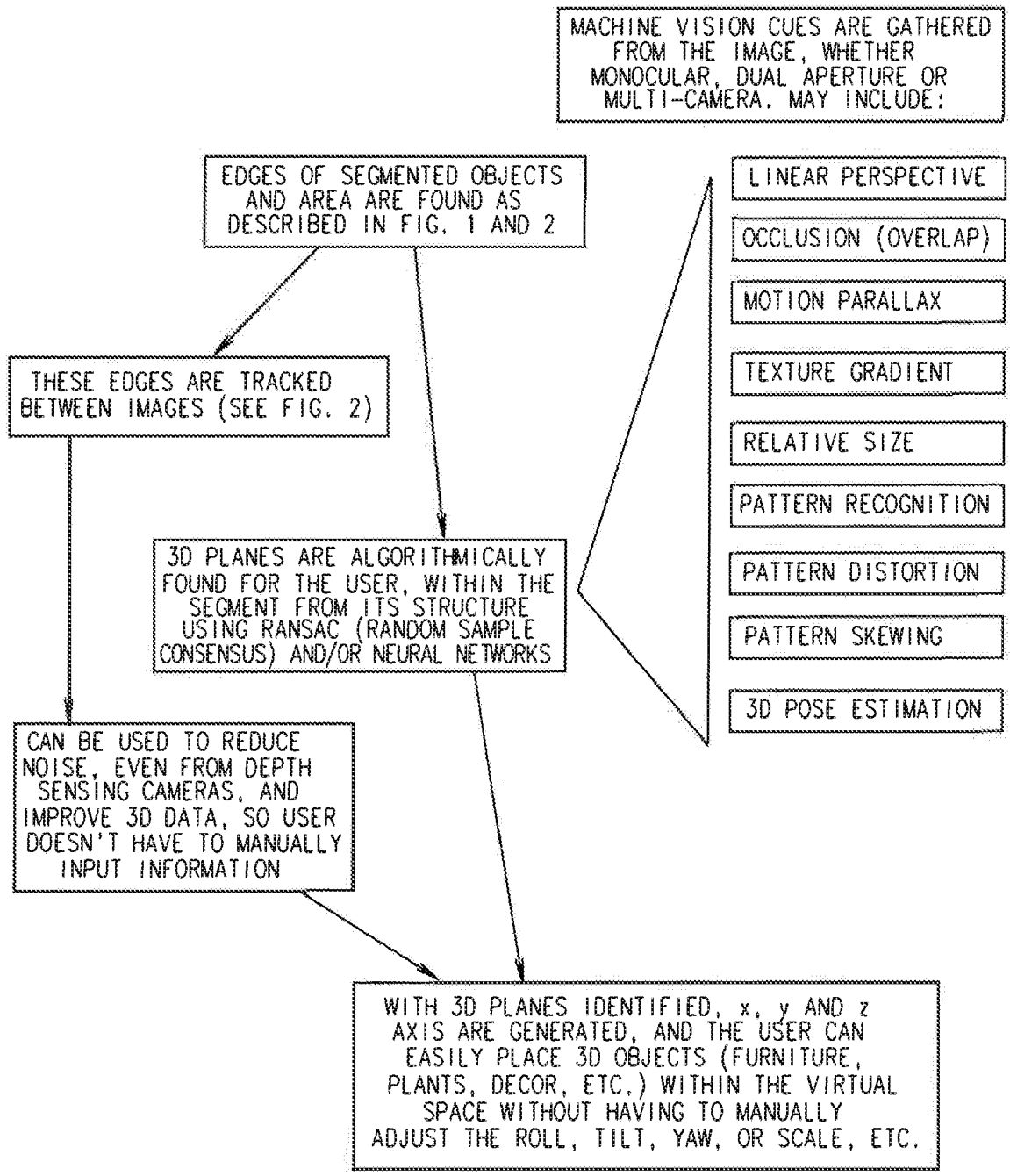
FIG. 3 is a flow chart showing the steps in an embodiment employing a segmentation process as set forth in FIGS. 1 and 2, and using additional steps to track planes, objects and/or in 3D information gathering.
Figure 4:
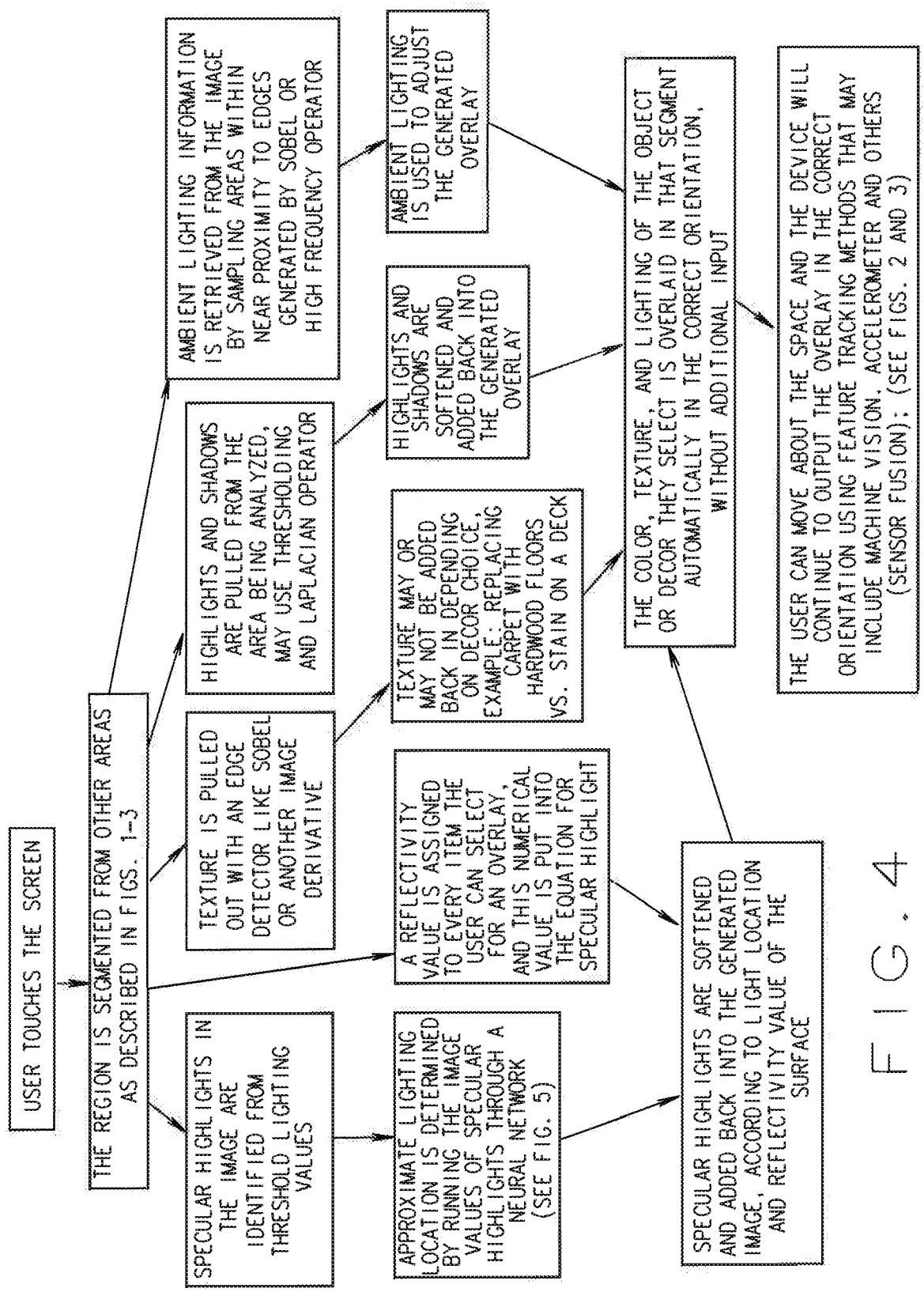
FIG. 4 is a flow chart showing the steps in an embodiment employing a segmentation process as set forth in FIGS. 1-3, and using additional steps to provide enhanced realistic output, lighting and realism in the AR imaging.
Figure 5:
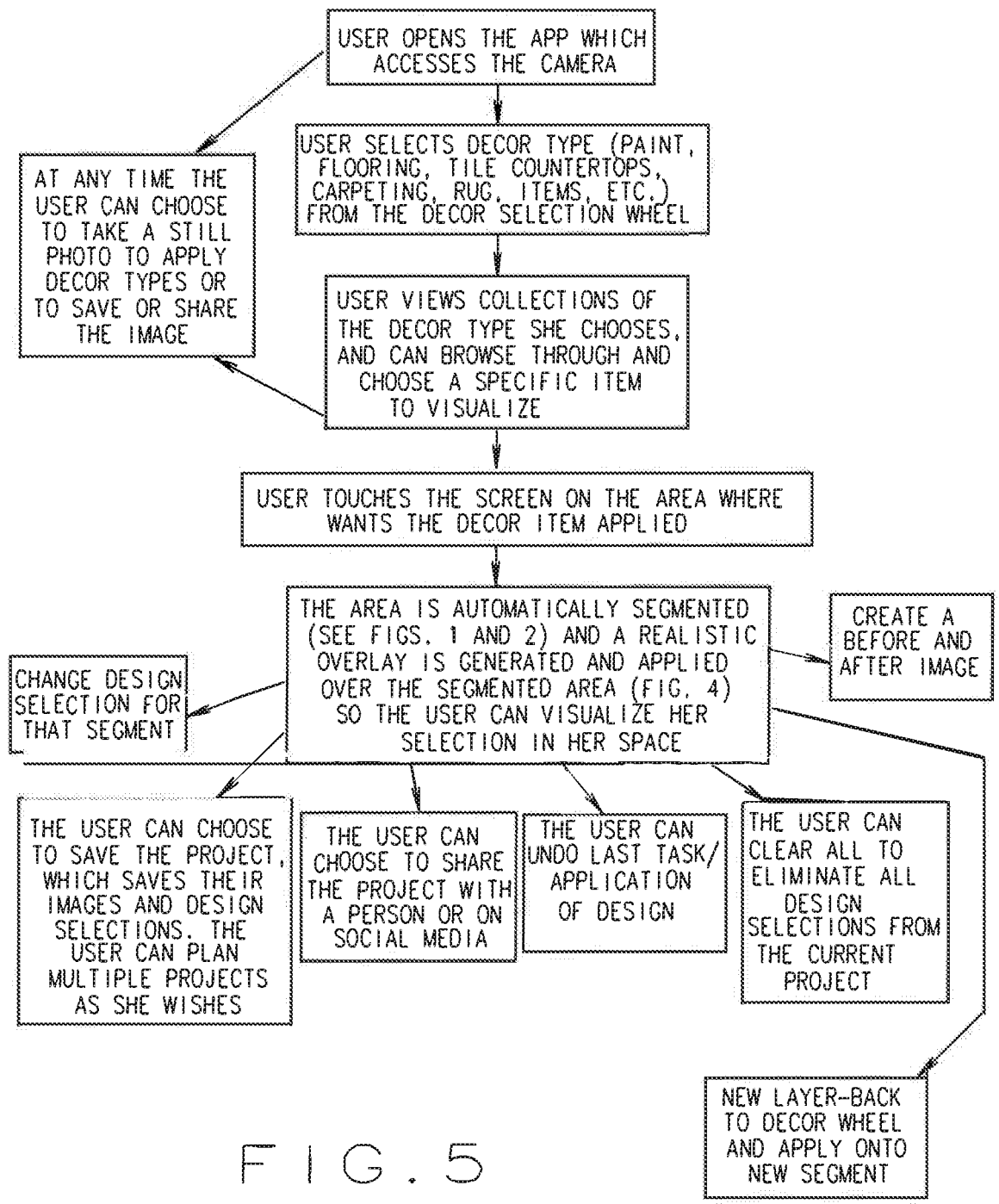
FIG. 5 is a flow chart showing the steps a user can employ in an embodiment employing a segmentation process as set forth in FIGS. 1-4.
Figure 6:
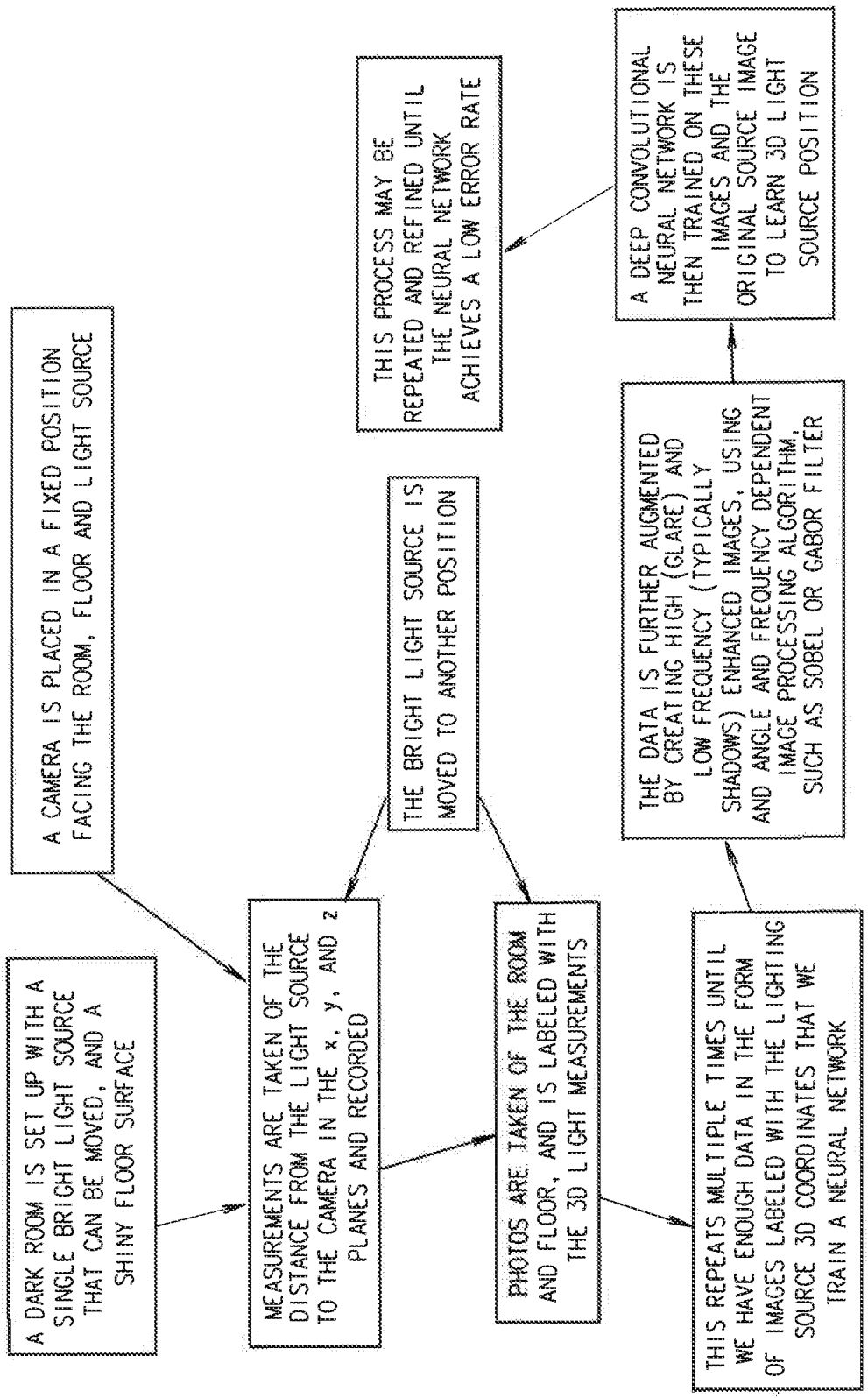
FIG. 6 is a flow chart showing the steps in an embodiment employing a process according to the invention for estimating lighting position in a room or area.
Figure 7:
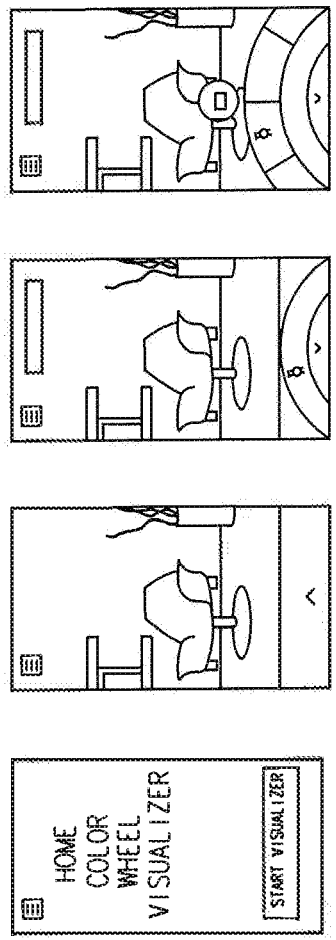
FIG. 7 is a schematic depiction of step-by-step use of a User Interface Wheel according to an embodiment of the invention.
Figure 7:
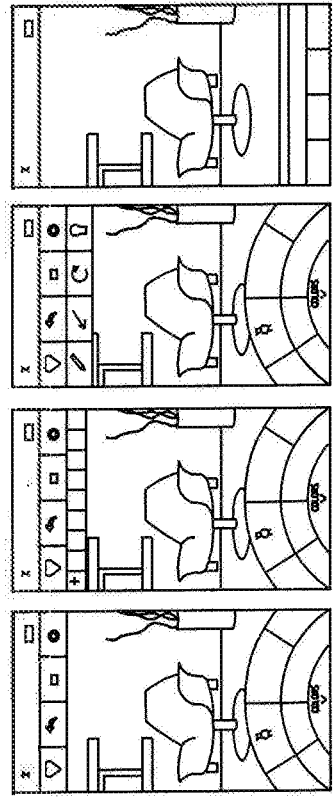
Figure 7:
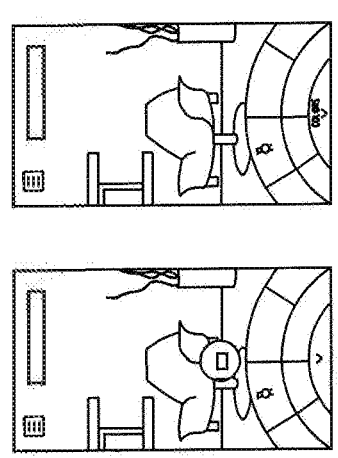

The foregoing summary, as well as the following detailed description of certain embodiments will be better understood when read in conjunction with the appended drawings. As used herein, an element or step recited in the singular and preceded with the word "a" or "an" should be understood as not excluding the plural or said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Thus, a system and method are provided for capturing an image of a physical space and designing a multidimensional artificial depiction of design option modifications to that depiction. The system and method can be employed for a variety of purposes such as improvements to an interior, exterior or landscaping. The system uses a mobile device or computer and employs augmented reality (AR) processing techniques as described herein. The system also employs computer-readable (CR) software programs to identify and segment surfaces and objects in the physical and multidimensional artificial spaces; to determine lighting in the spaces, and to map locations into three-dimensional (3D) depictions. A user interface is also included to provide user input and computer feedback; a user-control component is used to change any of multiple features within the depiction. When employed as described herein, the system can create an overlay of the multidimensional artificial space as applied to the physical space.

Examples of how the system can be used (and as described herein and in the drawings), include placing or changing the lighting in the space, both statically and as a visualization of the space in real time with design selections having been incorporated. Another way the system can be used is to generate a "memory" of the location and features of the multidimensional artificial space in a memory device. For example, a CR software program can utilize the stored memory of the location and features of the multidimensional artificial space so that as a camera on the mobile device or computer moves around a physical space, the multidimensional artificial space is actually displayed on its screen. This can be stored or can operate in "real time". Thus, the user interface allows the user to select items to be replaced, added or deleted in a multidimensional artificial space.

It should also be noted that the above-described system can be employed for capturing an image of a physical space and designing a multidimensional artificial space as an overlay changing one, at least two, or many features simultaneously.

This can be set up as one would envision a "wheel". Under this methodology, each segment of the wheel could be set apart for multiple categories of design, including a texture base. Another embodiment employing a wheel includes at least two categories—a first category which is a design feature to be visualized, and a second category which is a design category to choose from.

In a related aspect, a system and method are provided for performing machine vision segmentation on a surface, object, or a combination of surfaces and objects in either a physical or virtual space. The system and method are designed to be able to include various combinations of the steps and components of providing a user with a mobile device or computer having a touch-sensitive screen; providing the user with a depiction of the physical or virtual space on the screen; providing a user-interface for the user to touch a point on the depiction on the touch-sensitive screen; providing the mobile device or computer with a feature for tracking the point over time and as the user moves; providing a feature for maintaining the point selection of the user and gathering samples over time; providing a feature which captures small images of areas surrounding the point to make a sample of that point; providing a feature which allows for a cluster analysis of the images or to train a neural network to analyze the images; provide a feature configured to compare each sample to its surrounding points; providing a feature to train a neural network or use a pre-trained network to find other matches in the entire image; or if the points are similar to the sample within a threshold, to continue to spread and sample using a flood-fill-type algorithm; or to use a neural network trained in edge detection and continuous texture detection to also identify possible borders of the selection; providing a feature configured to combine one or more of the above features to yield a segmented area; providing a feature configured to continuously collect and update data as the user moves and the borders of the segment are found and tracked; and providing a feature configured to provide an overlay of color, surface or object generated in the segmented area; and providing a processing device configured to execute the CR software programs and features provided; and a memory device operatively coupled to the processing device. The processing device is configured to execute the CR software programs provided utilizing data newly developed or stored in memory or a combination thereof to generate the overlay in the segmented area.

In another aspect of the invention, as segmentations are run as described above, a non-flickering segmentation is run. In this embodiment, the user moves through her environment and segmentation masks are generated and collected. The collected masks can be adjusted for affine movement, rotation and other features so that corresponding points are found between images. Areas of the masks are compared to each other with weighted voting based on the certainty of the segment. When some or part of a mask is removed using this technique, it is replaced with data from other masks determined to be valid. This allows the user can return to a previously viewed area with stronger statistical certainty of segmentation and a smoother AR output.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are not meant to be limiting and are intended as exemplary embodiments. Many other embodiments employing components known to those skilled in the art will be apparent to them upon review and upon reviewing the above description. The scope of the various embodiments of the invention should, therefore, be determined with reference to the appended claims, along with the full scope of equivalents to which such claims are entitled.

What is claimed is:

1. A method for performing segmentation on a surface, object, or combination of surfaces and objects in a physical or virtual space comprising one or more combinations of the following steps, thereby obtaining enhanced AR images of the surface or object:

providing a user with a mobile device or computer having a touch sensitive screen;

providing the user with a depiction of a space on the screen;

providing a user interface for the user to touch a point on the depiction on the touch sensitive screen;

providing the mobile device or computer with a CR software program comprising a feature tracking CR software program to track the point over time and as the user moves;

providing the mobile device or computer with a CR software program which maintains the point selection of the user and gathers samples over time;

providing the mobile device or computer with a CR software program which captures small images of areas surrounding the point to make a sample of that point;

providing a CR computer software configured to provide a cluster analysis to analyze the images or to train a neural network to analyze the images;

providing a CR computer software configured to compare each sample to surrounding points;

providing a CR computer software configured to train a neural network or use a pre-trained network to find other matches in the entire image; or if the points are similar to the sample within a threshold, to continue to spread and sample using a flood fill type algorithm; or to utilize a neural network trained in edge detection and continuous texture detection to also identify possible borders of the selection;

providing a CR computer software program configured to combine one or more of the CR computer software programs to yield a segmented area;

providing a CR computer software configured to continuously collect and update data as the user moves and the borders of the segment are found and tracked;

providing a CR computer software configured to provide an overlay of color, surface or object generated and overlaid in the segmented area;

providing a processing device configured to execute the computer readable (CR) software programs provided; and providing a memory device operatively coupled to the processing device, wherein the processing device is configured to execute the CR software programs provided based on data provided or stored in memory or a combination thereof to generate the overlay in the segmented area.

2. A method for performing segmentation on a surface, object, or combination of surfaces and objects in a physical or virtual space as set forth in claim 1, the method further comprising a step of utilizing small images of surrounding areas to continue said segmented area to a space that extends beyond the visible space of the touch screen.

3. A method for performing segmentation on a surface, object, or combination of surfaces and objects in a physical or virtual space as set forth in claim 1, the method further comprising a step of enabling the overlay of the segmented area to be changed by a providing a selection from a design category.

4. A method for performing segmentation on a surface, object, or combination of surfaces and objects in a physical or virtual space as set forth in claim 3, wherein the design category is of changing the lighting of the space.

5. A method for performing segmentation on a surface, object, or combination of surfaces and objects in a physical or virtual space as set forth in claim 1, wherein the segmented area is a CR representation of a room or landscape.

6. A method for performing segmentation on a surface, object, or combination of surfaces and objects in a physical or virtual space as set forth in claim 5, wherein the room or landscape defines an overlay representative of the color or texture of the space, wherein said CR is configured to update a segmented depiction of said room or landscape, thereby displaying a virtual representation of said room or landscape with a design selected by said user.

7. A method for performing segmentation on a surface, object, or combination of surfaces and objects in a physical or virtual space as set forth in claim 6, wherein said updated virtual representation of said room or landscape is configured to be altered in real-time or from memory.

8. A method for performing segmentation on a surface, object, or combination of surfaces and objects in a physical or virtual space as set forth in claim 1, the method further comprising a step of identifying and extending borders in said segmented area.

9. A method for performing segmentation on a surface, object, or combination of surfaces and objects in a physical or virtual space as set forth in claim 8, wherein said segmented area is configured to include a mask along said identified and extended border, said mask capable of being adjusted for affine movements.

10. A method for performing segmentation on a surface, object, or combination of surfaces and objects in a physical or virtual space as set forth in claim 1, the method further comprising a step of assessing said captured images surrounding said point and assigning a weight to said captured images based on content captured.

11. A method for performing segmentation on a surface, object, or combination of surfaces and objects in a physical or virtual space as set forth in claim 10, the method further comprising a step of extending said segmented area in a virtual environment, wherein said extended segmented area is populated based the weighting applied to said captured images.

* * * * *